(No Model.)
T. A. EDISON.
DYNAMO ELECTRIC MACHINE.
No. 373,584. Patented Nov. 22, 1887.
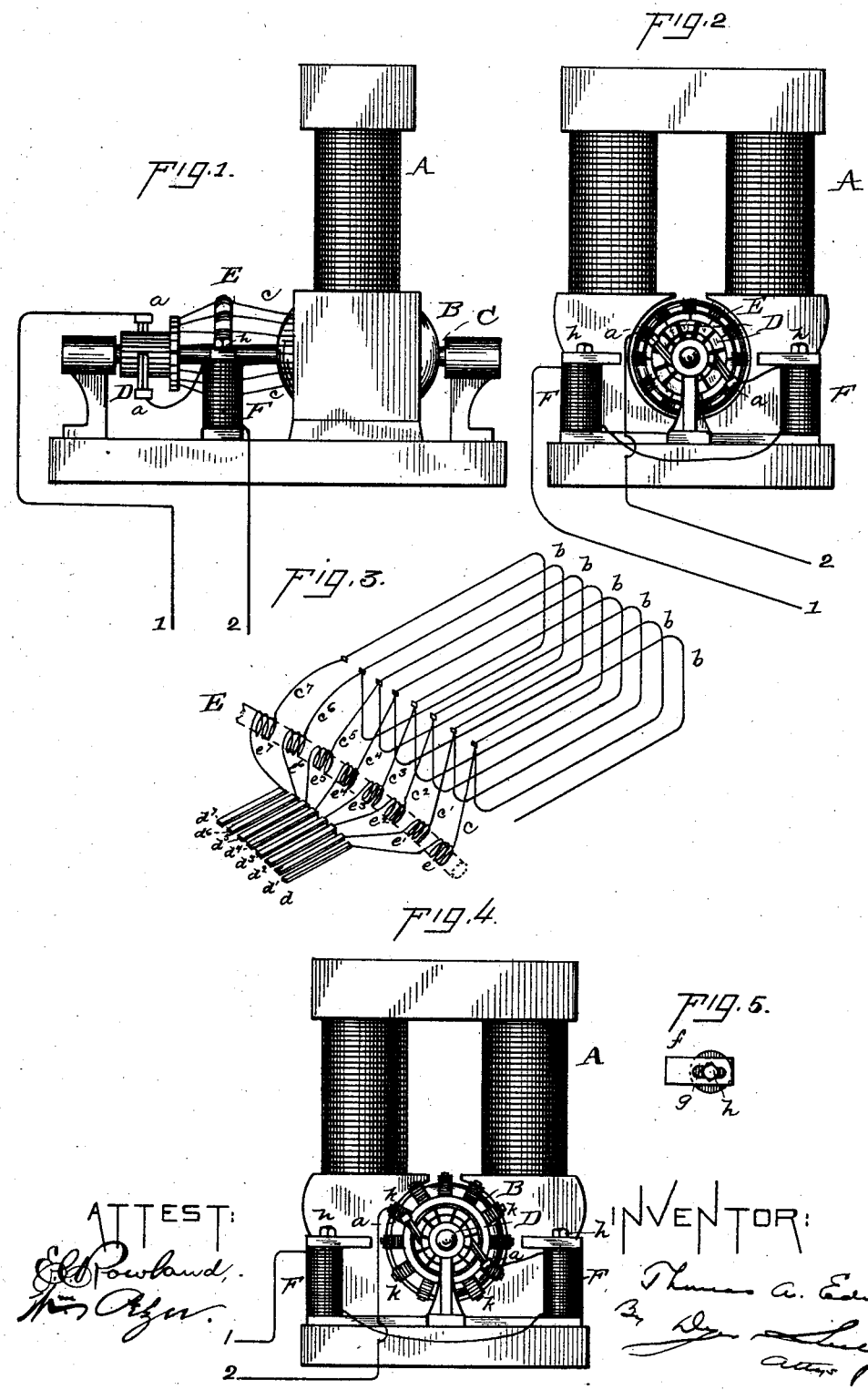

UNITED STATES PATENT OFFICE.

THOMAS A. EDISON, OF LLEWELLYN PARK, NEW JERSEY.

DYNAMO-ELECTRIC MACHINE.

SPECIFICATION forming part of Letters Patent No. 373,584, dated November 22, 1887.

Application filed December 28, 1886. Serial No. 222,755. (No model.)

*To all whom it may concern:*

Be it known that I, THOMAS A. EDISON, of Llewellyn Park, in the county of Essex and State of New Jersey, have invented a certain new and useful Improvement in Dynamo-Electric Machines, (Case No. 714,) of which the following is a specification.

The object of my invention is to avoid the spark which occurs at the commutator of a dynamo-electric machine, due to the breaking of the short circuit through an armature-coil, arising when two blocks of a commutator are bridged by a brush. I accomplish this by making each connection from the armature-coils to the commutator through an extra coil revolving in an extra field of force, such extra coils being so arranged that at the moment of bridging two commutator-blocks one of said extra coils is in a condition to generate an electromotive force contrary to that in the short-circuited armature-coil, whereby when the short circuit is broken the discharge and spark due to such breaking are prevented. I prefer to place upon the armature-shaft, between the armature and commutator, a ring-armature wound with or otherwise carrying several separated coils of wire, each of which coils is included directly in one of the connections which extend at intervals from the continuously-wound armature-coil to the different metal blocks of the commutator. A small magnet is placed with its poles on opposite sides of this ring, such poles being very narrow and adjusted close to the ring, and the coils on the ring being so far separated that only two coils directly opposite each other on the ring are ever in such position relative to the poles at any one time as to generate any appreciable electro-motive force. The direction of winding of the coils on the ring is such that the electro-motive force generated in them is opposed to that generated by the short-circuiting of an armature-coil. The small extra field-magnet preferably has its coils directly in the armature-circuit of the machine, so that the electro-motive force in the extra coils varies with that in the armature-coils.

Instead of winding a number of separate coils on a ring, I may have an equal number of small electro-magnets projecting radially from a ring on the shaft, the coils of each magnet being connected like the ring-coils already described, and the effect being the same.

My invention is illustrated in the annexed drawings, in which—

Figure 1 is a side view of a dynamo-electric machine embodying my invention, with the ring form of extra armature; Fig. 2, a front view of the same; Fig. 3, a diagram illustrating the armature-connections; Fig. 4, a front view of a dynamo with the modified form mentioned for the extra coils, and Fig. 5 a top view of one of the poles of the extra field-magnet.

A is the field-magnet, B the armature, C the armature-shaft, and D the commutator-cylinder, of a dynamo-electric machine.

$a\ a$ are the commutator-brushes.

I have shown in Fig. 3 the ordinary Edison winding, though my invention is applicable to any continuously-wound armature. The armature-coils $b\ b$ are wound as shown, each coil being brought around the armature and connected at its ends by connections $c\ c'$, &c., to two consecutive commutator-blocks, $d\ d'$ or $d^2\ d^3$, &c.

It will be seen that when any two commutator-blocks are bridged by a brush the coil connected therewith will be short-circuited, and when the brush moves on and breaks the bridge the short circuit will be broken and a discharge-spark will occur on the commutator-cylinder. To obviate this I make use of the following devices:

Referring to Figs. 1, 2, 3, and 5, an iron ring, E, is mounted on the shaft between armature B and commutator D. The wires $c\ c'$, &c., extending from armature-coils to commutator-blocks, are each wound in a small coil, $e\ e'$, &c., around the ring E, the coils being separated upon the ring, as shown. The direction of winding of these coils is such, as already explained, as to generate counter electro-motive force opposed to that in the short-circuited armature-coils.

F is the extra field-magnet, placed on the base-plate of the machine, and having narrow pole-pieces $f\ f$ extending close to the ring G. These pole-pieces are preferably made adjustable by means of slots $g$ and bolts and nuts $h$. The coils of the magnet F are directly in the main circuit 1 2, extending from the brushes $e\ e$.

In the construction shown in Fig. 4 the magnet F is constructed and arranged as above described. Upon a ring, G, on the shaft are a number of radially-projecting electro-magnets, $k\,k$, whose coils are wound and connected in the same way relative to the armature-coils and commutator-bars as the coils $e$ on ring E in the other form. It is evident therefore that the coils of these magnets will have the same effect as the said coils $e$.

The operation is as follows: Suppose the brush on one side to bridge the commutator-bars $d$ and $d'$, and so short-circuit the armature-coil connected between said blocks. Then with the parts arranged as shown and described the extra coil $e'$ will be opposite the poles of magnet F, and will therefore generate a certain counter electro-motive force opposed to that in the short-circuited coil $b$, whereby the spark due to the breaking of the short circuit is obviated. At the same time bars on the opposite side of the commutator-cylinder are short circuited—for instance, $d^6$ and $d^7$—and then coil $e^7$ will be in the position to generate the opposing electro-motive force. As the commutator revolves and other coils are short-circuited, the extra coil for each armature-coil is brought in front of the extra magnet-poles and generates the necessary opposing electro-motive force. Since the coils of the extra field-magnet are in the armature-circuit, the strength of the extra field varies with the armature-current, and therefore the opposing electro-motive force always varies with the electro-motive force in the armature-coils. The adjustability of the pole-pieces permits them to be adjusted to such position as to generate the proper electro-motive force at the starting of the machine, after which the magnet takes care of itself.

By the use of my invention the necessity for changing the position of the commutator-brushes with variations in the load upon the machine is obviated, and the brushes may always be kept at the points of greatest generation, as they are shown in the drawings.

It is evident that my invention is equally applicable to dynamo electric machines used either as generators or as motors.

What I claim is—

1. In a dynamo-electric machine, the combination, with the field-magnet, the armature, and the commutator, of an extra field of force and extra inducing-coils therein, such coils producing a counter electro-motive force in the armature-coils short-circuited by the commutator-brushes, substantially as set forth.

2. In a dynamo-electric machine, the combination, with the field-magnet, the armature, and the commutator, of an extra magnet in the armature-circuit and extra inducing-coils producing a counter electro-motive force in the armature-coils short-circuited by the commutator-brushes, substantially as set forth.

3. In a dynamo-electric machine, the combination, with the field-magnet, the armature, and the commutator, of extra inducing-coils so arranged and situated that as each armature-coil is short-circuited one of said extra coils will produce a counter electro-motive force therein, substantially as set forth.

4. In a dynamo-electric machine, the combination, with the field-magnet, the armature, and the commutator, of extra inducing-coils, each interposed in a connection between the armature-coils and the commutator-bars, and an extra field of force for said coils, substantially as set forth.

5. In a dynamo electric machine, the combination, with the field-magnet, the armature, and the commutator, of an extra field-magnet, extra coils carried by the armature-shaft and revolving between the poles of said magnet, and wound so as to produce a counter electro-motive force in the armature-coils short-circuited by the commutator-brushes, substantially as set forth.

6. In a dynamo-electric machine, the combination, with the field-magnet, the armature, and the commutator, of an extra magnet, a ring on the armature-shaft revolving between the poles of said extra magnet, and a number of separated coils on said ring, each included in a connection between the armature-coils and the commutator-bars, and said coils being so wound as to produce an electro-motive force opposed to that of the armature-coils short-circuited by the commutator-brushes, substantially as set forth.

7. In a dynamo-electric machine, the combination, with the field-magnet, the armature, and the commutator, of the extra inducing-coils and the extra field-magnet having adjustable pole-pieces, substantially as set forth.

This specification signed and witnessed this 21st day of December, 1886.

THOS. A. EDISON.

Witnesses:
WM. PELZER,
E. C. ROWLAND.